US012120797B2

(12) United States Patent
Abbo et al.

(10) Patent No.: US 12,120,797 B2
(45) Date of Patent: Oct. 15, 2024

(54) POWER SUPPLY DEVICE, A POWER RECEIVING DEVICE AND POWER SUPPLY AND RECEIPT METHODS

(71) Applicant: SIGNIFY HOLDING B.V., Eindhoven (NL)

(72) Inventors: Anteneh Alemu Abbo, Eindhoven (NL); Frits Tobi De Jongh, Beek en Donk (NL); Marcel Beij, Sint Oedenrode (NL); Johannes Petrus Wernars, Megen (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 186 days.

(21) Appl. No.: 17/638,485

(22) PCT Filed: Aug. 21, 2020

(86) PCT No.: PCT/EP2020/073536
§ 371 (c)(1),
(2) Date: Feb. 25, 2022

(87) PCT Pub. No.: WO2021/043601
PCT Pub. Date: Mar. 11, 2021

(65) Prior Publication Data
US 2022/0361308 A1 Nov. 10, 2022

(30) Foreign Application Priority Data
Sep. 6, 2019 (EP) .................................... 19195821

(51) Int. Cl.
*H05B 47/185* (2020.01)
*H05B 47/18* (2020.01)

(52) U.S. Cl.
CPC ........... *H05B 47/185* (2020.01); *H05B 47/18* (2020.01)

(58) Field of Classification Search
None
See application file for complete search history.

(56) References Cited

U.S. PATENT DOCUMENTS 9,985,532 B1 * 5/2018 Yoon ........................ H02M 1/08
10,674,585 B1 * 6/2020 Liu ........................ H05B 45/37
(Continued)

FOREIGN PATENT DOCUMENTS

CN 202930929 U 5/2013
CN 102983735 B 5/2015
(Continued)

*Primary Examiner* — Wilson Lee

(57) ABSTRACT

In one aspect, a device is adapted to transmitting power to, or receive power from, a remote device over first and second communication lines (DALI+, DALI−) and to communicate with the remote device over the first and second communication lines. A first driver implements a first communications protocol which comprises coupling the first and second communication lines together to encode a first signal level and isolating the first and second communication lines from each other to encode a second signal level. This may be a DALI protocol. A second driver implements a second communications protocol which comprises modulating the first communication line with a signal having a low modulation depth. The second communications protocol means there is always a voltage difference between the two communication lines to enable continuous power harvesting. A second aspect relates to efficient power transfer by disabling a current limiter function, when possible.

10 Claims, 9 Drawing Sheets

(56) References Cited

U.S. PATENT DOCUMENTS

| | | | | |
|---|---|---|---|---|
| 10,746,358 | B1 * | 8/2020 | Palfreyman | F21S 2/005 |
| 2010/0213759 | A1 | 8/2010 | Covaro | |
| 2016/0258613 | A1 * | 9/2016 | Wang | F21V 29/763 |
| 2017/0265283 | A1 * | 9/2017 | Coombes | H05B 45/20 |
| 2017/0290110 | A1 * | 10/2017 | Wilson | H05B 45/38 |
| 2017/0353150 | A1 * | 12/2017 | Alon | H02S 40/34 |
| 2018/0177022 | A1 * | 6/2018 | Vijayakumar | G01R 31/44 |
| 2018/0270588 | A1 * | 9/2018 | Saman | H03F 3/45636 |
| 2019/0215920 | A1 * | 7/2019 | Clauberg | H02M 3/33576 |
| 2020/0119725 | A1 * | 4/2020 | Zanbaghi | H03F 3/185 |
| 2020/0288546 | A1 * | 9/2020 | Cumpston | H05B 45/46 |
| 2020/0351994 | A1 * | 11/2020 | Liu | H05B 45/355 |
| 2021/0313799 | A1 * | 10/2021 | Priebe | H02H 9/04 |

FOREIGN PATENT DOCUMENTS

| | | | |
|---|---|---|---|
| JP | 4340795 | B2 | 10/2009 |
| JP | 2016502304 | A | 1/2016 |
| WO | 2017099628 | A1 | 6/2017 |
| WO | 2018189046 | A1 | 10/2018 |

* cited by examiner

POWER SUPPLY DEVICE, A POWER RECEIVING DEVICE AND POWER SUPPLY AND RECEIPT METHODS

CROSS-REFERENCE TO PRIOR APPLICATIONS

This application is the U.S. National Phase application under 35 U.S.C. § 371 of International Application No. PCT/EP2020/073536, filed on Aug. 21, 2020, which claims the benefit of European Patent Application No. 19195821.4, filed on Sep. 6, 2019. These applications are hereby incorporated by reference herein.

FIELD OF THE INVENTION

This invention relates to a power supply device, a power receiving device and power supply and receipt methods, in particular for powering devices over communication lines.

BACKGROUND OF THE INVENTION

Powering devices over communication lines of a communications bus is a known approach. One example is the powering of sensors using a DALI bus, within a lighting infrastructure. The deployment of sensors integrated in luminaires and powered by power supplies integrated with the LED driver is becoming an accepted technical solution. This exploits the full potential of Internet of Things (IoT) in the lighting domain.

By way of example, the applicant has introduced a so-called sensor ready extension to the basic DALI signaling technology. Drivers equipped with this technology can provide power to luminaire-integrated or ceiling-integrated sensors.

One of the challenges with delivering power this way originates from the DALI signaling scheme. This scheme involves shorting the two lines of the bus to encode a digital zero. This shorting function ceases power supply to the sensor. This leads to reduction of power transfer by 50% during times when communication is taking place.

It would be desirable for a device to be able to communicate using the DALI (or similar) communications protocol, but avoid interruption to power delivery over the communications bus.

Another challenge with delivering power this way is to enable the lowest possible standby mode in the power receiving device and/or to enable the maximum of functionality in a low power standby mode.

SUMMARY OF THE INVENTION

The invention is defined by the claims.

According to examples in accordance with a first aspect of the invention, there is provided a device for transmitting power to a remote device over first and second communication lines and for communication with the remote device over the first and second communication lines, comprising:

- a power source for providing power to the first and/or second communication lines;
- a first driver for implementing a first communications protocol which comprises coupling the first and second communication lines together to encode a first signal level and isolating the first and second communication lines from each other to encode a second signal level; and
- a second driver for implementing a second communications protocol which comprises modulating the first communication line with a signal having a modulation depth below 100%.

According to examples in accordance with a second aspect of the invention, there is provided a device for receiving power from a remote device over first and second communication lines (DALI+, DALI−) and for communication with the remote device over the first and second communication lines, comprising:

- a power harvesting circuit for harvesting power from the first and/or second communication lines;
- a first driver for implementing a first communications protocol which comprises coupling the first and second communication lines together to encode a first signal level and isolating the first and second communication lines from each other to encode a second signal level;
- a second driver for implementing a second communications protocol which comprises modulating the first communication line with a signal having a modulation depth below 100%.

The invention thus provides a device for transmitting power over a communications bus, and a device for receiving power over the communications bus. In each case, the device can communicate using a protocol by which a signal level (e.g. digital 0) is encoded by a shorting of the two lines. The other signal level (digital 1) is encoded by a power supply voltage on one communication line and a ground level on the other. However, in addition, an encoding with a lower modulation depth is possible, i.e. such that there is always a voltage difference between the two communication lines, such voltage difference enabling continuous power harvesting.

The modulation depth is below 100%, i.e. the two lines are never at the same voltage. The modulation depth may be below 50%, below 25% or below 10%.

By modulation depth is meant the difference between (i) the differential communication line voltage encoding a logic low and (ii) the differential communication line voltage encoding a logic high, as a percentage of the differential communication line voltage encoding a logic high. For example, for 8V and 10V the modulation depth is $2/10=20\%$. For conventional DALI, the differential line voltages may be 0V and 10V so the modulation depth is $10/10=100\%$.

A bit may be encoded by the encoded signal level, or else a set of signal level transitions may encode a single bit, for example as is the case for Manchester encoding.

The power delivered over the communications bus, for example to remote devices in the form of the sensors, is not affected by the second communications protocol.

In each case, the device may comprise a controller, wherein the controller is adapted to send a request to the remote device using the first communications protocol to determine if the remote device has the capability to use the second communications protocol.

In this way, one device can request of the other if it is able to switch to the second communications protocol. The first communications protocol may be a default protocol with which all devices for use in the system are compatible.

The controller may then be adapted to request a switch of the remote device to the second communications protocol, if it is determined that the remote device has the capability.

This request can be sent in either direction, i.e. the power supply side or the power harvesting side may request of the other side if the second communications protocol can be used. In practice, it is the power harvesting side which benefits from the second communications protocol, and hence the request is typically generated at the power harvesting side.

In each case, the controller of the device may be adapted to:

indicate using the first communications protocol, in response to a request from the remote device using the first communications protocol, that the device has the capability to use the second communications protocol.

This capacity indication is the response to the request discussed above. The controller is then adapted to switch to the second communications protocol, in response to an activation request from the remote device.

These features provide a function discovery mode, in which the one device, typically the power harvesting device, identifies if the connected power delivery device can communicate with the second communications protocol. If this is not the case, the communication defaults to the first communications protocol, allowing backward compatibility.

Thus, a power harvesting device, such as a sensor, becomes compatible with an existing power delivery device, such as a lighting driver, but is also compatible with a modified lighting driver having the capability for both communications protocols.

In each case, the device may comprise a current limiter circuit between a power terminal and the first communication line, wherein the second driver comprises a shorting circuit for bypassing the current limiter circuit. The power terminal may be the power source output for the power supply side or it may be a power harvesting circuit input for the power harvesting side. The second communications protocol is thus based on bypassing a current limiting section. The current limiting section induces a voltage drop, and the second communications protocol thus involves applying or not applying that voltage drop.

In each case, the device may comprise:

a first receiver for receiving data encoded by the first communications protocol; and a second receiver for receiving data encoded by the second communications protocol.

Thus, the devices are able to perform bidirectional communications with the selected one of the two protocols.

The first receiver for example comprises a voltage supply and a pull down circuit for selectively coupling the voltage supply to the output or pulling the output to ground, in dependence on the voltage on the first communication line. This is for example a standard DALI receiver.

The second receiver for example comprises a high-pass filter for receiving the voltage on the first communication line, a voltage clamp, and a comparator with hysteresis which receives the clamped filtered voltage, and generates the output of the second receiver.

The comparator implements detection between the two levels of the second communications protocol. The high pass filter removes any DC offset, thereby allowing detection of the small modulation depth signal of the second communications protocol.

The first communications protocol is for example the DALI protocol.

The invention also provides a lighting system comprising a power supply side device as defined above, comprising a lighting controller, and a power harvesting device as defined above, comprising a luminaire.

The invention also provides a method of transmitting power to a remote device over first and second communication lines and for communication with the remote device over the first and second communication lines, comprising:

providing power to the first and/or second communication lines; and selecting between:

a first communications protocol which comprises coupling the first and second communication lines together to encode a first signal level and isolating the first and second communication lines from each other to encode a second signal level; and a second communications protocol which comprises modulating the first communication line with a signal having a modulation depth below 100%.

The invention also provides a method for receiving power from a remote device over first and second communication lines and for communication with the remote device over the first and second communication lines, comprising:

harvesting power from the first and/or second communication lines; and selecting between:

a first communications protocol which comprises coupling the first and second communication lines together to encode a first signal level and isolating the first and second communication lines from each other to encode a second signal level; and a second communications protocol which comprises modulating the first communication line with a signal having a modulation depth below 100%.

According to another aspect of the invention, there is provided a device for receiving power from a remote device over first and second communication lines, comprising:

a power harvesting circuit for harvesting power from the first and/or second communication lines;

a current limiter circuit between the first communication line and a power delivery terminal;

a current limiter circuit (between the first communication line and a power terminal of the power harvesting circuit;

a bypass unit for bypassing the current limiter circuit; and a controller for determining if the current limiter circuit can be bypassed and for controlling the bypass unit.

This device is able to choose if the current limiting function (discussed above) can be bypassed. This is of interest to reduce standby power consumption, or to enable additional functions to be maintained during a standby mode as a result of the more efficient harvesting of energy in the power receiving device. The functions may for example include an RF link for control and occupancy sensing.

The device may comprise a voltage sensor for measuring a voltage at the first communication line or at the power delivery terminal, wherein the controller is adapted to actuate the bypass unit in dependence on the measured voltage.

The dropping of a voltage (before or after the current limiter) indicates that the remote device (e.g. a DALI driver) is a not able to deliver the required load current to keep the load voltage above a minimal level, i.e. the load is discharging a buffer capacitor of the receiving device below a minimal limit.

Bypassing the current limiter circuit reduces losses so that the load may be able to draw the desired current and power from the communication lines.

The controller may be adapted to change settings of the device to reduce the power demand if the measured voltage drops while the bypass unit is active.

This indicates that even with the more efficient power transfer to the load, the current demand of the load cannot be met by the communications lines. In this case, the functions performed by the device may be scaled back, again to prevent collapse of the communication line voltage.

This aspect also provides a method for receiving power from a remote device over first and second communication lines, comprising:

determining if a current limiter circuit, between the first communication line and a power terminal, can be bypassed and if so, controlling a bypass unit. to bypassing the current limiter circuit; and harvesting power from the first and/or second communication lines with the current limiter circuit bypassed or not bypassed depending on the determination.

The methods may be implemented at least in part by software.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
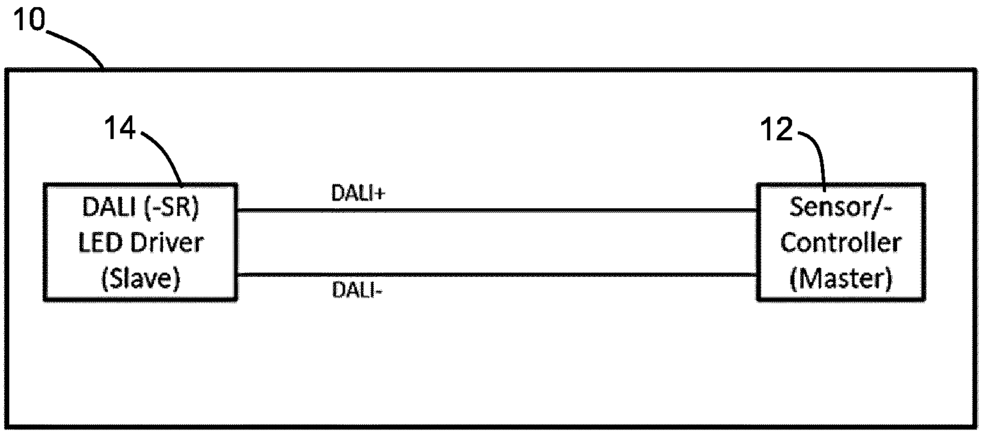
FIG. 1 shows basic architecture of a luminaire equipped with a sensor-controller device powered by a known DALI driver.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a device which is adapted to transmitting power to, or receive power from, a remote device over first and second communication lines and to communicate with the remote device over the first and second communication lines. A first driver implements a first communications protocol which comprises coupling the first and second communication lines together to encode a first signal level and isolating the first and second communication lines from each other to encode a second signal level. This may be a DALI protocol. A second driver implements a second communications protocol which comprises modulating the first communication line with a signal having a low modulation depth. The second communications protocol means there is always a voltage difference between the two communication lines to enable continuous power harvesting.

Another aspect makes use of a bypass function for a current limiter, so as to improve the efficiency of energy transfer, particularly in a standby mode of operation.

FIG. 1 shows basic architecture of a luminaire 10 equipped with a sensor-controller device 12 powered by a known DALI sensor ready LED driver 14. The driver functions as the slave and the sensor-controller device functions as the master.

Communication as well as power transfer takes place over a pair of communication lines DALI+ and DALI− forming a two-wire differential bus. Drivers equipped with this technology can provide power to luminaire-integrated or ceiling-integrated sensors.

A conventional DALI network consists of a controller functioning as the master and one or more lighting devices (e.g., electrical ballasts and dimmers) that have DALI interfaces. The controller monitors and controls each lighting device by means of a bi-directional data exchange. The DALI protocol permits devices to be individually addressed or to simultaneously address multiple devices. Data is transferred between the controller and the devices by means of an asynchronous, half-duplex, serial protocol over the two-wire differential bus. Such conventional DALI devices use a single pair of wires to form the bus for communication to all devices on a single DALI network.

A DALI network may include various sensors and wireless receivers for receiving remote wireless commands. Such sensors may be provided as part of a particular lighting unit, i.e. within a luminaire housing, or they may be separate stand-alone sensors, which also communicate with the DALI network either over the two-wire differential bus, or else wirelessly.

Figure 2:
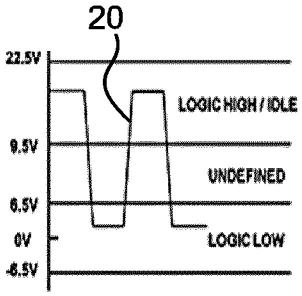
FIG. 2 shows the voltage level thresholds for DALI.
Figure 3:
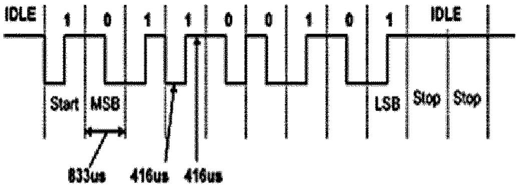
FIG. 3 shows a typical DALI data message.
Figure 4:
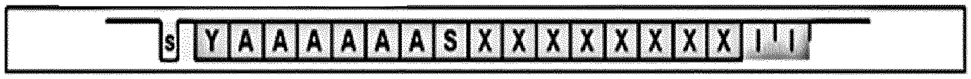
FIG. 4 shows a DALI frame format.

The signaling in DALI communication is shown in FIGS. 2 to 4.

FIG. 2 shows the voltage level thresholds and a signal 20 which conveys signal levels “1010”. A logic high is defined as above 9.5V and a logic low is defined as below 6.5V. In practice, the voltage between the communication lines is zero to encode a logic low.

FIG. 3 shows a typical data message. The encoding operates by shorting the bus to transmit Manchester encoded bits. Thus, each bit comprises both logic signal levels. In traditional applications, where long DALI wires are routed in a building, the large signal swing (22.5 V max as shown in FIG. 2) provides protection from effects of interference.

FIG. 4 shows a frame format, where s is a start bit, YAAAAAAS is an address cycle and XXXXXXXX is a data byte. The last two bits are stop bits.

Figure 5:
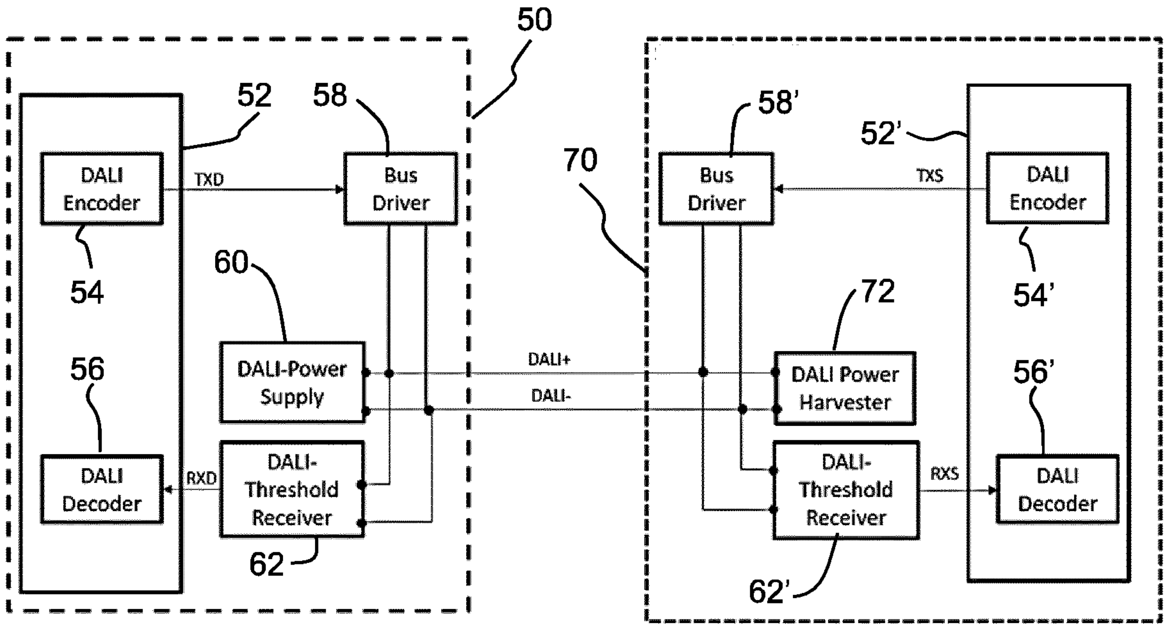
FIG. 5 shows the main components of a so-called sensor ready powering and communication scheme.

FIG. 5 shows the main components of a sensor ready powering and communication scheme.

The driver 50 (which is the slave) comprises a microcontroller 52 which includes a DALI encoder 54 and a DALI decoder 56. The DALI encoder provides a transmit signal TXD to a bus driver 58 which controls the shorting of the communication lines as explained above. The power is supplied to the DALI bus from a DALI power supply 60. The receipt of data is implemented by a threshold receiver 62 which then generates a receive signal RXD for the DALI decoder 56.

The sensor 70 (which is the master controller) has analogous components to the driver 50, namely controller 52' with a DALI encoder 54' for driving a bus driver 58' with a transmit signal TXS. The controller 52' has a DALI decoder 56' receiving a receive signal RXS from a DALI threshold receiver 62'. The power is received by a DALI power harvester from the DALI bus, to power the sensor subsystems.

The LED is for example implemented as the slave because it functions as an actuator that waits for commands from a master, namely from a sensor or communication device that hosts various sensing and lighting control functions. However, the opposite configuration is also possible.

The driver 50 thus includes a low voltage power supply 60 to provide power to the sensor(s) connected to the DALI bus.

One of the challenges with delivering power in this way originates from the DALI signaling scheme which shorts the bus, as explained above, thereby removing power from the sensors. This leads to reduction of available power by 50% during communication and thus restricts sensing and sensor data processing capabilities.

Sensor modules need to be designed with this restriction in mind and need to continuously monitor the available energy. In addition to this, if heavy computation is needed while DALI communication takes place, a large storage capacitor is needed to make sure the bus voltage doesn't drop below a predefined DALI "HIGH" voltage level threshold (9.5V as shown in FIG. 2). Besides increasing cost, a large capacitor size has a significant impact on the sensor module size and subsequently on the luminaire mechanical design.

It is therefore desirable to maximize the usable power over the DALI lines. The invention provides a signaling scheme in which power delivered to the sensors is kept to the maximum possible value. To make this possible, a communication scheme is provided by which the sensor module identifies if the connected driver can communicate in this maximum power mode; if this is not the case, the communication driver defaults to the normal DALI operation, allowing backward compatibility.

Figure 6:
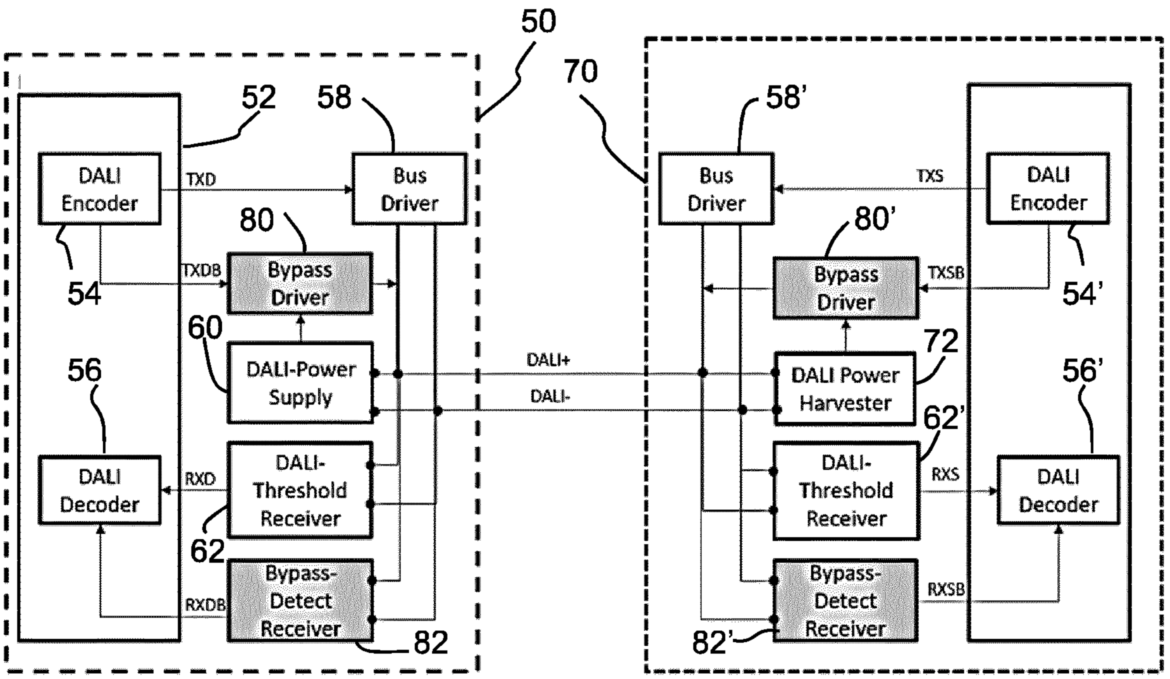
FIG. 6 shows a system in accordance with the invention, with a driver and sensor controller.

FIG. 6 shows a system in accordance with the invention, with a driver and sensor controller.

The system is shown as a modification to the system of FIG. 5, and the same references are used for the same components.

The additional maximum power mode may be considered to be a bypass mode of operation, in that it bypasses the normal shorting encoding method of conventional DALI communication.

The driver 50 has an additional bypass driver 80. It is powered by the DALI power supply 60 and receives a bypass enable signal TXDB from the DALI encoder 54. The driver 50 also has a bypass detection receiver 82. It detects when the bypass function is active and generates a bypass detection signal RXDB for the DALI decoder 56.

The sensor 70 has an additional bypass driver 80' powered by the DALI power harvester 72. It receives a bypass enable signal TXSB from the DALI encoder 54'. The sensor 70 also has a bypass detection receiver 82'. It detects when the bypass function is active and generates a bypass detection signal RXSB for the DALI decoder 56'.

The bypass driver 80, 80' supplements the normal bus driver and the bypass detection receiver 82, 82' supplements the normal DALI threshold detector.

In a preferred implementation (which enables backward compatibility) the additional modules are activated only if both sides can communicate in the bypass mode. Otherwise, the communication defaults to normal DALI using the standard bus driver and DALI threshold receiver. This normal DALI communication may be considered to be a first communications protocol and the bypass mode is a second communications protocol.

The driver and sensor are thus designed to operate in a bypass mode of communication, and optionally also support normal DALI communication.

The bypass mode, implemented by the bypass driver 80, 80', comprises a low swing signal modulation on the DALI+ line, rather than a shorting function. The restriction to the sensor power consumption is thus avoided during data communication.

By low swing signal modulation is meant that one of the communication lines (e.g. the first communication line DALI+) is modulated with a signal having a modulation depth smaller than 100% as explained above. Thus, the voltage difference between the lines is never zero, i.e. they are never shorted together. In this way, power harvesting is possible from both the low and high signal levels.

The DALI bus voltage can fluctuate depending on the load current, so the logic 1 and 0 in the bypass mode can have variable voltage levels. The voltage swing between the two logic levels is preferably 500 mV or more.

In order to realize the low swing operation, the bypass driver makes use of the voltage differences that exists across the current limiter circuits in the DALI power supply and the DALI power harvester. This is explained below.

The sensor is preferably able to query the driver for availability of the bypass mode of communication and activate it accordingly. The driver can then respond the query command and activate the bypass mode in response to the request from the sensor. This is also explained further below.

Figure 7:
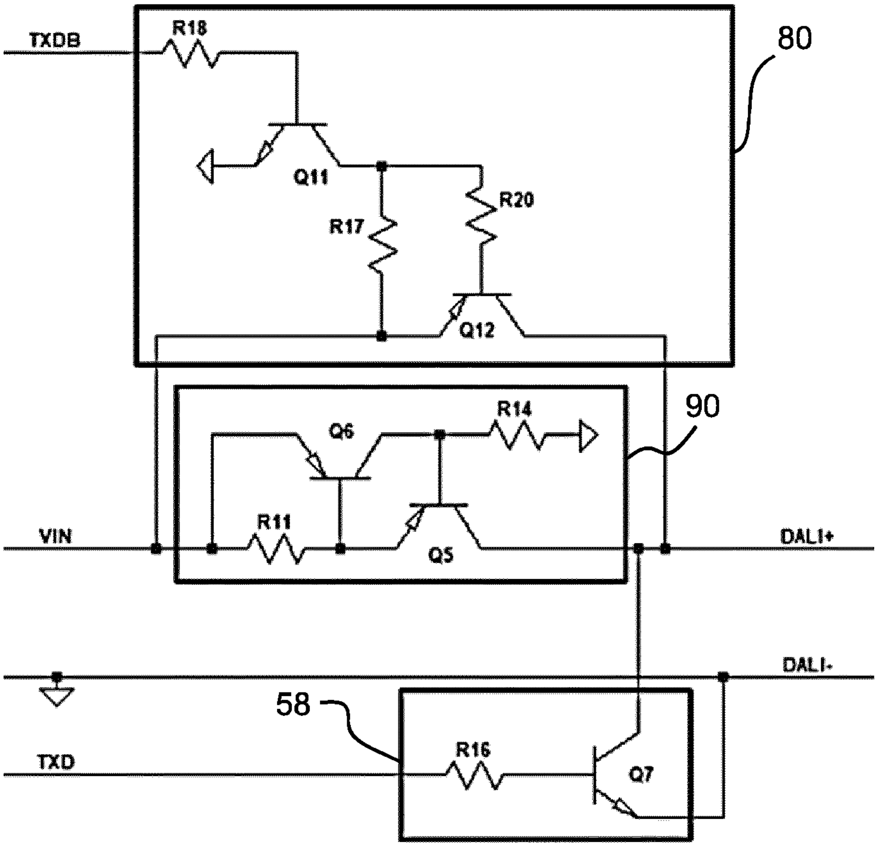
FIG. 7 shows an example implementation of circuits in the driver.

FIG. 7 shows an example implementation of circuits in the driver, in particular the bypass driver 80, as well as the conventional bus driver 58, and also shows a current limiter 90 which forms part of the DALI power supply 60. The current limiter 90 is in series between an input VIN and the DALI+ line. The input VIN is received from the power supply and may be considered generally to be a power terminal. Thus, the current limiter circuit 90 is between a power terminal VIN and the first communication line DALI+.

The conventional DALI bus driver comprises a shorting switch Q7 for shorting the communication lines DALI+, DALI−, and a base resistor R16. It is controlled by the transmit signal TXD. The bus driver 58 is not activated during the bypass mode of operation.

The bypass driver 80 comprises a shorting switch Q12 between the input voltage VIN and the DALI+ line. Thus, it bypasses the current limiter. It is driven by an inverting level shifter formed by transistor Q11 and resistor R17. The inverting level shifter receives the bypass enable signal TXDB. Base resistors R20 and R18 limit the current to the respective transistors.

The current limiter 90 comprises a current limiting transistor Q5 with a base voltage generated in dependence on the current flowing through a series current sense resistor R11. This current sense voltage controls a transistor Q6 which in turn sets the base voltage of the current limiting transistor Q5.

Under normal operation, the current limiter 90 establishes a voltage difference between its input VIN and its output, which is the DALI+ line. The current limiter is used to guarantee the DALI startup time specification, and is a standard component within DALI apparatus.

When the bypass switch Q12 is activated, i.e., signal TXDB driven high, the DALI+ line will be pulled high to the level of VIN and goes back to its lower level when TXDB goes low. In this way, it is possible to modulate the voltage of DALI+ line without preventing current supply to the sensor side.

Figure 8:
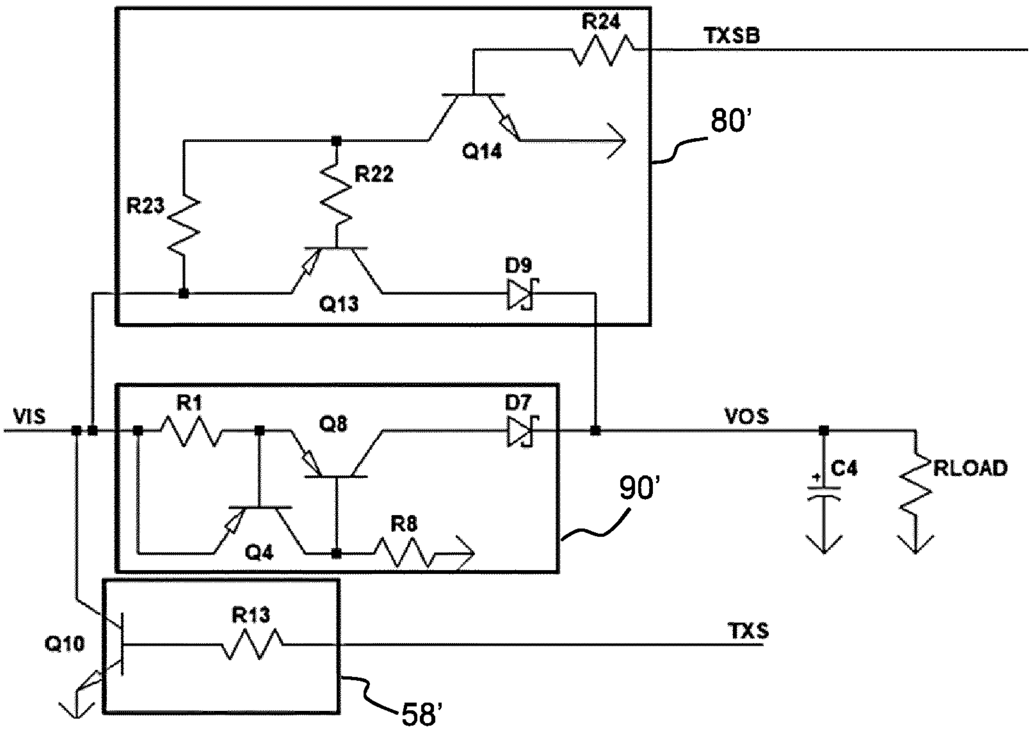
FIG. 8 shows an example implementation of the circuits in the sensor.

FIG. 8 shows an example implementation of the circuits in the sensor, in particular the bypass driver 80', as well as the conventional bus driver 58', and also the current limiter 90' which forms part of the DALI power harvester 72. The current limiter is in series between an input VIS (which is from the DALI+ line) and the voltage VOS supplied to the sensor load (represented as resistor RLOAD and capacitor C4). The voltage VOS is the power supply to the load and may be considered generally to be a power terminal. Thus, the current limiter circuit 90 is between a power terminal VOS and the first communication line VIS.

The DALI power harvester comprises a rectifier (not shown) for rectifying the voltage between the communication lines.

The rectifier is used to allow polarity reversal during wiring. The communication line VIS is connected to the positive rectified output, i.e. it is connected to DALI+ through the rectifier. If the driver and sensor are equipped with polarity-correct connectors (e.g., RJ45), the rectifier can be avoided and VIS would then be directly connected to DALI+.

The conventional DALI bus driver 58' comprises a shorting switch Q10 for grounding the input VIS and a base resistor R13. It is controlled by the transmit signal TXS. The bus driver 58' is not activated during the bypass mode of operation.

The bypass driver 80' comprises a shorting switch Q13 between the input voltage VIS and the output VOS and a Zener diode D9. Diode D9 blocks unwanted discharge of the storage capacitor C4 via the collector-base PN junction of Q13.

Thus, it bypasses the current limiter. It is driven by an inverting level shifter formed by transistor Q14 and resistor R23. The inverting level shifter receives the bypass enable signal TXSB. TXSB is pulled high when a data bit is being sent. Base resistors R24 and R22 allow to limit the current to the respective transistors.

The current limiter 90' again comprises a current limiting transistor Q8 with a base voltage generated in dependence on the current flowing through a series current sense resistor R1. This current sense voltage controls a transistor Q4 which in turn sets the base voltage of the current limiting transistor Q8.

Diode D7 blocks unwanted discharge of the storage capacitor C4 via the collector-base PN junction of Q8.

Since there is a voltage difference between the current limiter input VIS and output VOS, activation of the bypass switch has the effect of pulling down the DALI+ line to the level of VOS. When TXSB is pulled low, the switch Q13 opens and the DALI+ line goes back to its high level. This modulation process allows continuous current supply to the storage capacitor C4 during DALI communication.

Figure 9:
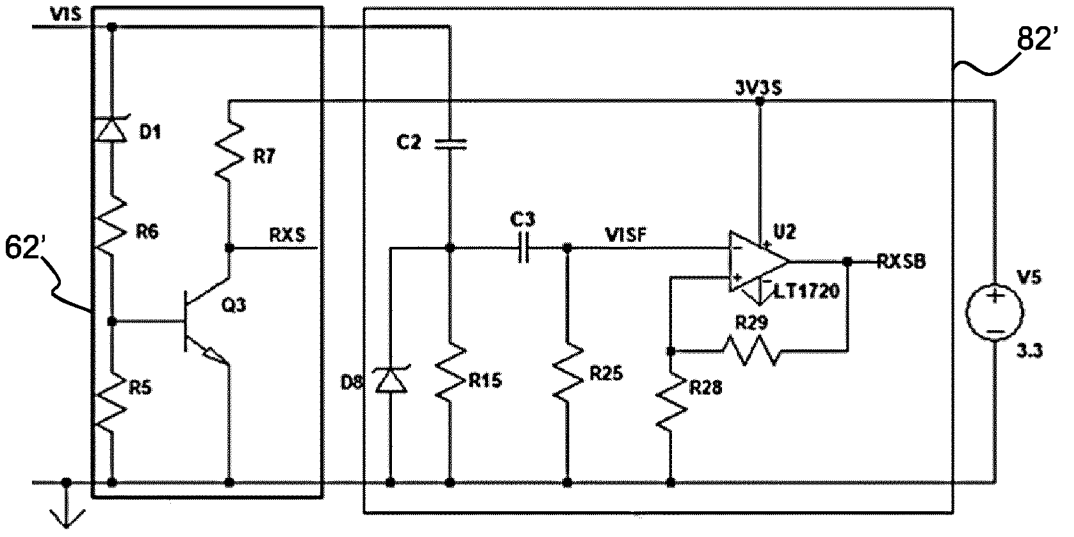
FIG. 9 shows the receiving circuit on the sensor side that can be used to detect normal DALI and the bypass mode communication.

FIG. 9 shows the receiving circuit on the sensor side that can be used to detect normal DALI (output RXS) and the bypass mode communication (output RXSB).

The bypass detect receiver 82' comprises a two-stage high-pass filter (C2, R15 and C3, R25), a voltage clamp (Zener diode D8) and a comparator U2 with hysteresis.

The high-pass filter helps to extract the modulation pulses and blocks the DC bus voltage that could vary with the load.

In order to limit the voltage swing at the input of the comparator U2, the Zener diode D8 is placed at the output of the first filter stage. The filtered signal VISF is finally compared to a reference value set by the ground and the hysteresis feedback (resistors R28, R29 forming a positive feedback loop of the comparator U2) to convert the modulation pulses to appropriate logic voltage levels.

The output of the comparator U2 is the bypass detection signal RXSB.

The typical voltage levels for logic 1 and 0 at the comparator input are 250 mV and −250 mV, respectively, with corresponding threshold voltages of 100 mV and 7 mV.

FIG. 9 also shows the conventional DALI threshold receiver 62'. A Zener diode D1 is used to set the base voltage of a pull down transistor Q3, so that the output RXS is pulled down if the input VIS is above a threshold voltage of 7.5V and pulled up if VIS is below the threshold.

Figure 10:
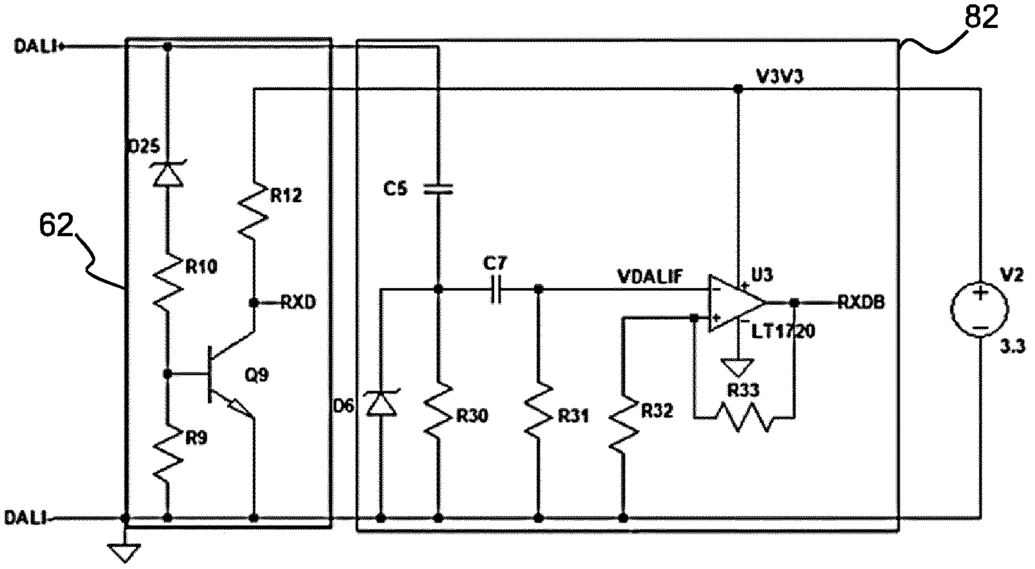
FIG. 10 shows the receiving circuit on the driver side that can be used to generate normal DALI and the bypass mode communication.

FIG. 10 shows the receiving circuit on the driver side that can be used to generate normal DALI (output RXD) and the bypass mode communication (output RXDB).

The circuits are analogous to FIG. 9. Thus, the bypass detect receiver 82 comprises a two-stage high-pass filter (C5, R30 and C7, R31), a voltage clamp (Zener diode D6) and a comparator U3 with hysteresis.

The filtered signal VDALIF is compared to a reference value set by the ground and the hysteresis feedback (resistors R32, R33 forming a positive feedback loop of the comparator U2) to convert the modulation pulses to appropriate logic voltage levels.

The output of the comparator U2 is the bypass mode detection signal RXDB.

The DALI threshold receiver 62 has a Zener diode D25 to set the base voltage of the pull down transistor Q9, so that the normal DALI output RXD is pulled down if the input DALI+ is above a threshold voltage of 7.5V and pulled up if the input is below the threshold.

Figure 11:
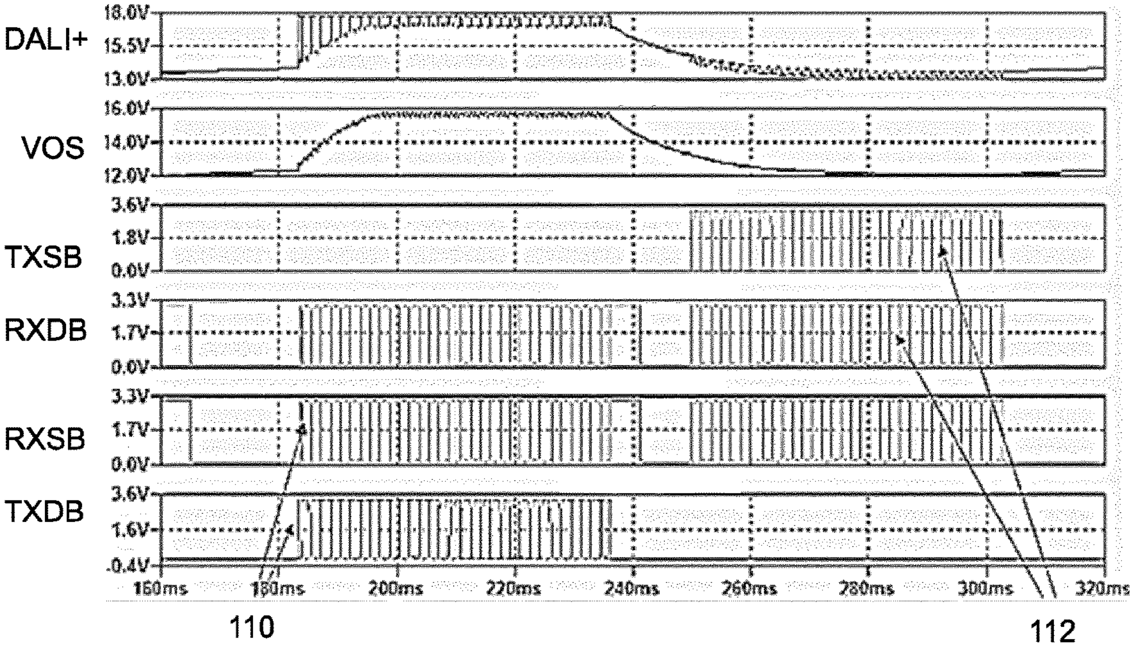
FIG. 11 shows simulation results of the bypass mode communication.

FIG. 11 shows simulation results of the bypass mode communication. The equivalent load is set to RLOAD=250 Ohms so that the current drawn is approximately 48 mA at 12V.

The top plot show the DALI+ line signal.

The second plot shows the output voltage to the load, VOS, after the current limiter.

The third plot shows the drive signal TXSB to the bypass driver in the sensor. This is the signal transmitted by the sensor.

The fourth plot shows the corresponding received signal RXDB at the driver.

The sixth (bottom) plot shows the drive signal TXDB to the bypass driver in the driver. This is the signal transmitted by the driver.

The fifth (one up from bottom) plot shows the received signal RXSB at the sensor corresponding to the drive signal TXDB.

The initial transmitted and received pulses 110 relate to transmission from the driver and reception at the sensor. The later pulses 112 relate to transmission from the sensor and reception at the driver.

As can be seen from the waveforms for the DALI bus voltage DALI+ and harvested sensor voltage VOS, the bypass communication scheme maintains the bus voltage high (12V or higher) and provides the required load power.

The other signal traces show how pulses transmitted from one side are received on the other side as explained above. The actual frame format can be arranged to follow any suitable protocol (DALI or other single-wire communication techniques).

Figure 12:
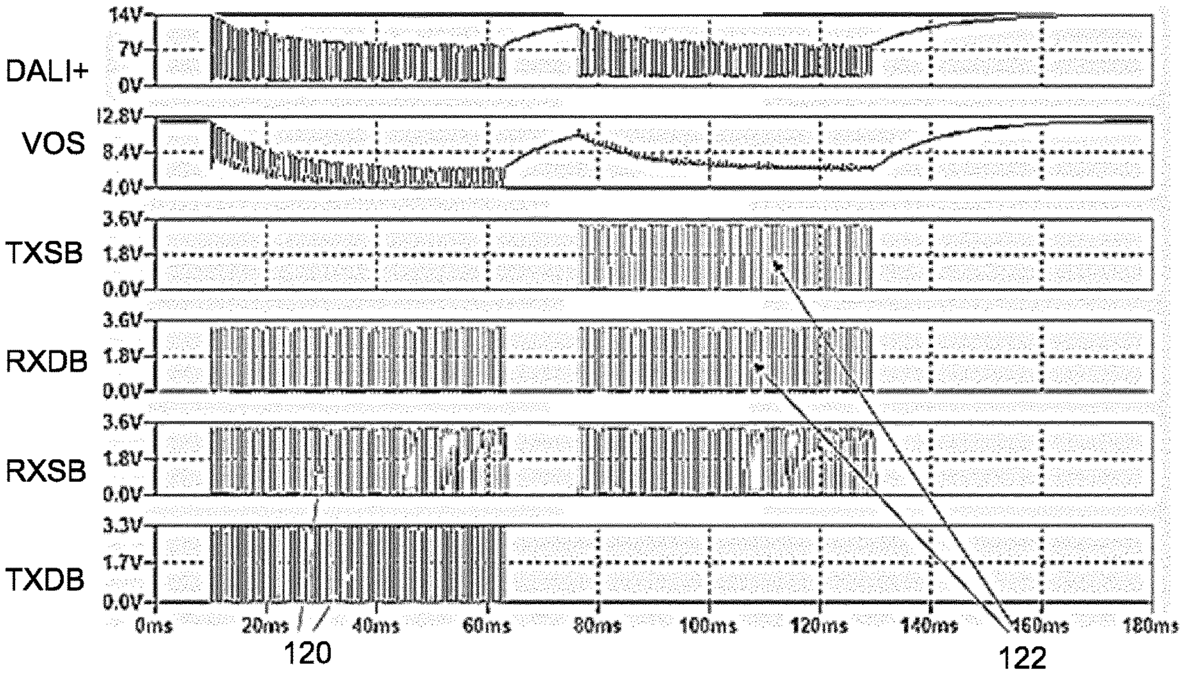
FIG. 12 shows, as a comparison, waveforms of normal DALI communication for the same load as in FIG. 11.

As a comparison, waveforms of normal DALI communication for the same RLOAD value are shown in FIG. 12.

The top plot shows the DALI+ line signal.

The second plot shows the output voltage to the load, VOS, after the current limiter.

The third plot shows the drive signal TXS to the (conventional) bus driver in the sensor. This is the signal transmitted by the sensor.

The fourth plot shows the corresponding received signal RXD at the driver.

The sixth (bottom) plot shows the drive signal TXD to the (conventional) bus driver in the driver. This is the signal transmitted by the driver.

The fifth (one up from bottom) plot shows the received signal RXS at the sensor corresponding to the drive signal TXD.

The initial transmitted and received pulses 120 relate to transmission from the driver and reception at the sensor. The later pulses 122 relate to transmission from the sensor and reception at the driver.

The bus voltage DALI+ and sensor voltage VOS drop as the communication goes on indicating that the sensor cannot draw the specified current when DALI communication takes place. In the simulation, VOS drops from 12V down to 6V—corresponding to a factor 4 drop in power consumption. The sensor needs to introduce additional control schemes to reduce its power consumption which makes the overall solution complicated and effectively reduces the capability of the sensor (such as the functions it can execute, and when). The other option is increasing the storage capacitor, which has impact on the sensor dimension.

The bypass mode of operation of the invention avoids this limitation of DALI.

When operating in the bypass mode, the voltage between the communication lines toggle between voltages that are close to each other as explained above.

When the power harvesting device is transmitting (the sensor and master controller in this example), the switching voltages are the input bus voltage (VIS) and storage capacitor voltage (VOS).

When the power supply device is transmitting (the driver in this example), the switching voltages are the supply voltage (VIN) and bus voltage (DALI+).

At any given moment, there is at least one current limiter in place to avoid excessive current flow, in that only the current limiter at the transmission side is bypassed. Thus, the second communications protocol does not give rise to safety issues.

Figure 13:
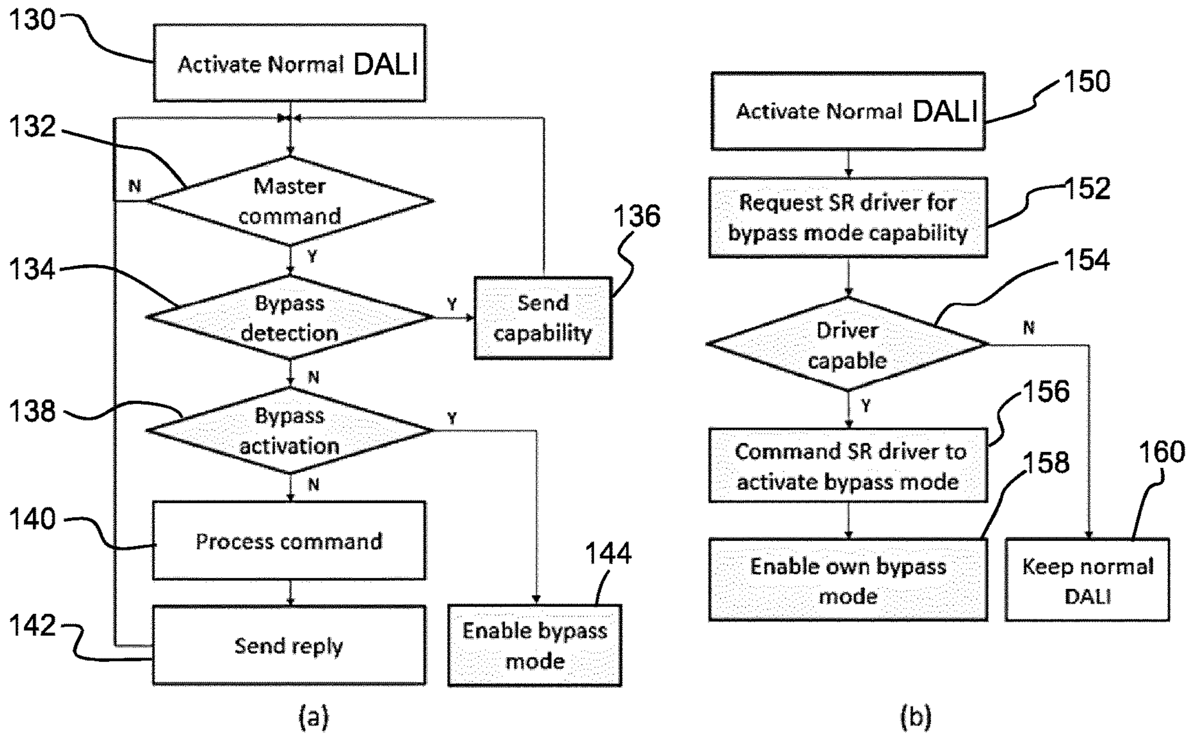
FIG. 13 shows a power transmission and communication method.

FIG. 13 shows a power transmission and communication method. FIG. 13(*a*) shows the method implemented in the driver (i.e. the power supply side) and FIG. 13(*b*) shows the method implemented in the sensor (i.e. the power harvesting side).

In FIG. 13(*a*), the method starts in the normal DALI mode in step 130, i.e. the default first communications protocol.

A command is awaited in step 132. When the command is received, it is determined in step 134 if it is a received request from a connected remote device as to whether the device has the capability to use the second communications protocol. If it is such a request, information is sent in step 136 (using the first communications protocol) confirming that the device has the capability.

If the command is not a capability request, it is determined in step 138 if it is a request from the remote device to switch to the second communications protocol. If it is such a request, the bypass mode is enabled in step 144. The second communications protocol is then used for subsequent communications.

Once the two sides agree to use the second protocol, they remember the mode of operation as long as they stay powered on. Up on power-up, re-negotiation is required via normal DALI.

If the command is not a switch request, the command is processed in step 140 using the first communications protocol.

A reply is then sent in normal manner in step 142.

In FIG. 13(*b*), the method also starts in the normal DALI mode in step 150, i.e. the default first communications protocol.

A request is made in step 152 to the connected remote device (the power supplying driver) as to whether the driver has the capability to use the second communications protocol. Thus, in step 154 it is determined if the remote device has the capability for the second communications protocol.

If the driver does not have the capability, the normal DALI mode (i.e. the first communications protocol) is kept in step 160.

If the driver does have the capability, a switch request is made in step 156 (using the first communications protocol).

In step 158, the device switches to the second communications protocol.

DALI is an example of a system in which there is communication and power delivered by a shared bus. This is one example of a power-line communication system.

This aspect of the invention can be applied to any power line communication system which uses a shorting of the power lines to encode one of the possible bits. Examples are DSI, the Digital Serial Interface, of Tridonic (Trade Mark), and the 1-Wire Interface, of Dallas Semiconductor/Maxim Integrated Products (Trade Marks).

The example above makes use of selectively bypassing and coupling a current limiter 90 to implement a voltage modulation.

Another aspect of the invention relates to the bypassing of the current limiter to reduce the associated power consumption and thereby enable a more power efficient standby mode or to allow increased functionality in the power receiving device for the same amount of power transmitted from the power supply to the power receiver in the standby mode.

Figure 14:
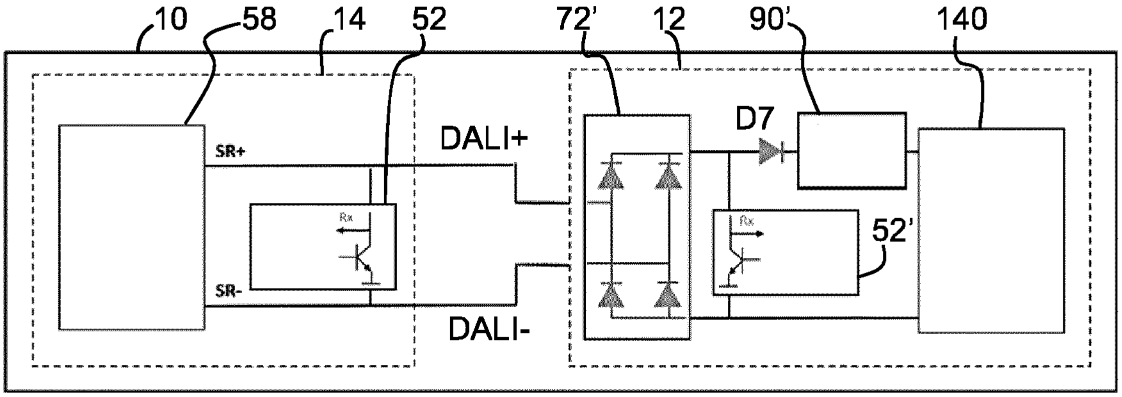
FIG. 14 shows the basic known configuration of a luminaire for explaining another aspect of the invention.

FIG. 14 shows the basic known configuration of a luminaire. The driver 14 comprises the driver controller 58 and the bus driver 52, all as discussed above. The sensor controller 12 comprises the controller 52', current limiter 90' and DALI power harvester 72', as also discussed above. The power harvester 72' comprises a full bridge rectifier as shown. The module driven by the harvested power, such as a sensor module, is shown as 140. The current limiter 90' is between one of the communication lines and a power delivery terminal, i.e. the power supply Vcc to the module 140.

By way of example, the driver is able to deliver a minimum of 52 mA at a minimum of 12V at its output, for a standby mode.

Figure 15:
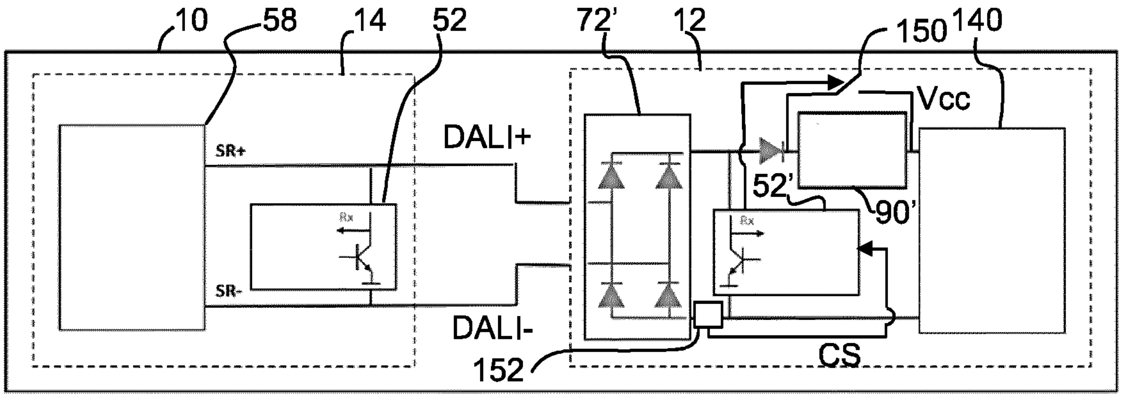
FIG. 15 shows how the circuit is modified to include a bypass unit for bypassing the current limiter circuit.

FIG. 15 shows how the circuit is modified to include a bypass unit (switch) 150 for bypassing the current limiter circuit. A controller (e.g., the controller 52') determines if the current limiter circuit can be bypassed and controls the bypass unit 150 accordingly.

The control of the bypass unit is explained in detail below. It can be in hardware, or firmware (i.e. software and a controller), whereas the current limiting circuit is a permanent hardware feature.

Figure 16:
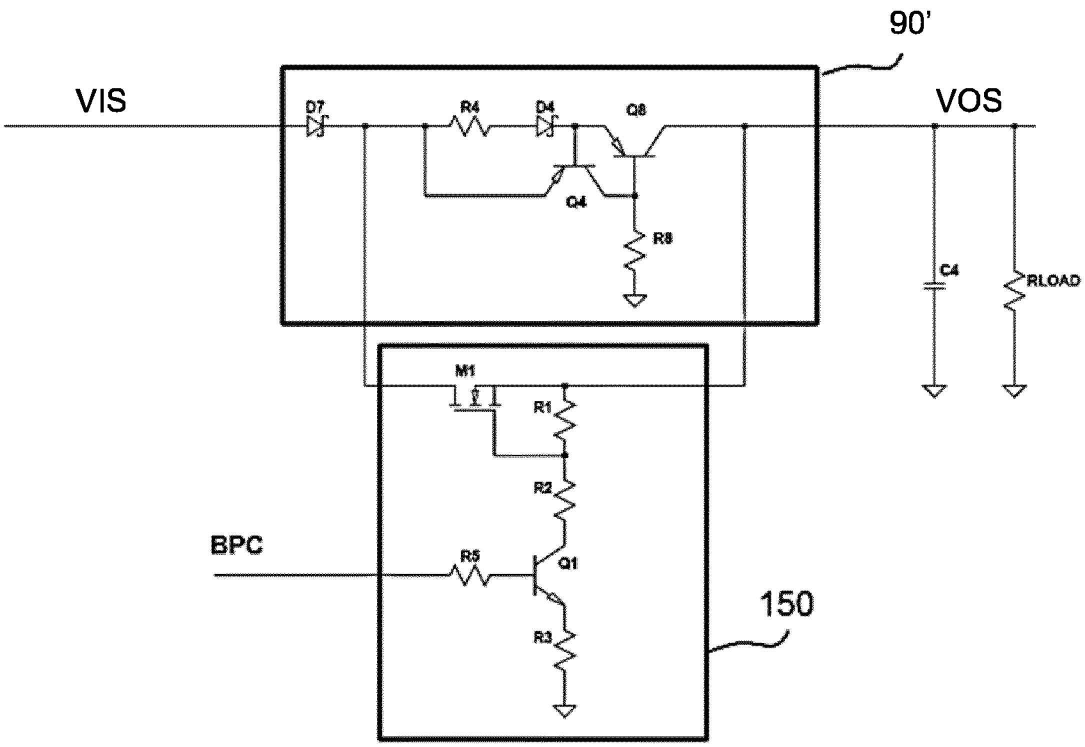
FIG. 16 shows an implementation of the circuit of FIG. 15 in more detail.

FIG. 16 shows an implementation of the circuit of FIG. 15 in more detail.

It shows that the bypass circuit 150 comprises a shorting transistor M1 which is controlled by a bypass control signal BPC from the controller 52'. The bypass control signal BPC is applied to the base of a transistor Q1.

In a preferred implementation, the bypass control signal BPC is generated by the power receiving device alone, without communication with other DALI devices. There may be such communication in a more sophisticated system.

The power receiving device is the master in the examples above. As a result, it controls the communications and is therefore aware of when the DALI bus is being used for communication and when it is not. There is for example no communication during a standby mode.

The BPC signal activates and de-activates the bypass switch 150.

In the example shown, the voltage VOS is provided to one end of a resistor divider R1, R2, R3 which includes the transistor Q1. When the transistor Q1 is turned on, the gate voltage of transistor M1 is defined by the resistor divider to turn on the transistor M1. When Q1 is turned off, the transistor M1 is turned off.

The power receiving device thus has a bypass switch to achieve a reduction in power loss of the DALI circuit and also increased sensor functionality by optimizing the power transfer of the available power from the driver.

FIG. 16 also shows a different design for the current limiter circuit 90' (compared to FIG. 8) with a different arrangement of Zener diodes D4, D7.

To ensure the system still operates according to the full DALI specification, the output voltage from the driver at node VIS should stay above a certain level. This can be measured, e.g. downstream of the rectifier at the input to the current limiter circuit. This measurement can take place when there is no DALI communication, or during the high bit level of the DALI communication. Alternatively, the voltage at node VOS after the current limiter can be measured, in which case the voltage drop between the communication line and Vcc is taken into account.

The current limiter is used to prevent that the load draws too much current at any time. If the current exceeds the design threshold (e.g. 52 mA), the bus voltage collapses. The current limiter may for example be set to 40 mA of current to be delivered to the load, to take account of losses in the current limiter, and thereby limit the current on the DALI bus to e.g. 50 mA.

The device that supplies the current (the driver) can provide more than the current-limiter value, but with more devices connected to the DALI bus this driver current is divided between multiple consumers.

If the load draws less current than the current limiter hardware allows, there is no issue. In other words, the voltage at the load is able to be maintained by charging the load capacitance using the DALI bus current.

However, if the load profile changes and the load needs more current, the current can reach the maximum value allowed by the current limiter. In other words, the load is trying to draw more current than the current limiter is allowing. When this maximum current limiter current is reached no additional current can flow to the load, even though more current is available from the DALI driver.

The need for more current results in a decreasing voltage at the load. In particular, the current-limited current that is being delivered is insufficient to maintain the load capacitance at the desired voltage. For example, if a special function is activated consuming a lot of power, such as a radar sensor, the load voltage is monitored. If this voltage drops, then it is determined that the current-limiter is at its maximum level.

The voltage (at VIS or VOS) is thus detected and the way it rises and falls is used to control the bypass switch. For example, if the voltage exceeds a first threshold voltage (e.g. 10V), this indicates that the bypass switch can be closed to achieve more efficient power transfer.

The bypass switch should be switched on under the condition the buffer capacitor C4 connected at output of the current limiter circuit 90' is already charged above the minimal specified DALI logical ‘high’ voltage level. It is then safe to operate in the bypass mode. A 50 mA current at the load side may for example experience a 1V drop in the current limiter, giving a 50 mW power loss. By bypassing the current limiter this additional 40 mW may be transferred to the load.

The more efficient use of the current delivered by the driver may be sufficient to drive the load and maintain the load voltage.

The sensor module draws simultaneously current from the buffer capacitor C4 and from the DALI driver. The maximal current from the DALI driver is given by the DALI driver with a minimal specification of 52 mA but in practice more current is available determined by the DALI driver circuitry implementation. For temporary periods the total current from C4 plus the DALI current can be much greater than 52 mA.

If a large current is drawn by the load (without the protection of the current limiter), there is a risk of collapse of the bus voltage. Thus, the voltage continues to be monitored so that a reduction in bus voltage can be detected. This may be detected as a second voltage threshold, which applies while the bypass function is active. The bypass switch is then opened.

In this case, the bypass function is then turned off, so that the current limiter becomes active, leading to a lower load current but a stable DALI bus voltage.

During DALI communication less power is available due to bus shorting by the DALI driver and sensor module for encoding logical zeros. Intense communication or multiple modules on the DALI bus can create a temporary lack of power so that the bypass switch is closed again. The power will recover when there is no or less communication or when there is less power consumption of other modules.

Thus, there is a resulting cyclic control of the bypass switch. The bypass switch is open if current limiting is needed because of a collapsing bus voltage. The bypass switch is closed when possible to avoid the power losses associated with the current limiter circuit.

If closing the bypass switch does not result in excess current being drawn, the system may be stable in that state. However, if excess current is drawn, leading to the commencing of collapse in the bus voltage as explained above, the bypass switch is opened again, to reactivate the current limiter function.

Another measure which can be taken is to adapt the demand of the load. The load can draw, depending on its state and function, different currents/power depending on its profile. Thus, in response to the decrease in voltage towards or past the first (10V) threshold (i.e. even with the power savings by disabling the current limiter, excessive current is needed to meet the load demand), the sensor functions may be switched off in a staggered manner, to regulate the current demand of the load. For example an IR sensor or an optical sensor may be switched off to reduce the overall current demand. In this way, the consumed power at the load is regulated. This may for example be needed while communications take place on the DALI bus, which give rise to a 50% reduction in the available harvested power.

In this way, the functionality of the load is switched to a less power consuming profile, to avoid a total power failure at the load and loss of functionality. For example the sensor may be configured to a minimum power load. In this situation, the voltage will not drop any lower (in that the current demand can be met by the current limited value even during communication).

The bypass switch is opened after the sensor module power consumption has been decreased to this lowest level by reducing the sensor functionality, and still the voltage level is dropping, for example to the second (lower) threshold mentioned above.

The voltage will only drop further in this way if the DALI bus is short-circuited for a very long time, but this is indicative of a DALI-bus failure, which will in any case cause a sensor shutdown.

The circuit operation thus be summarized as follows:

Starting

At mains power up of the DALI driver, the sensor module will be powered by the DALI lines. At mains power up, the sensor module bypass switch is open. The sensor module current limiter is active. This is to ensure the minimal high level DALI voltage (>9V) at power up.

At power up the sensor module functionality is set to a reduced level to ensure that the DALI supply is capable of powering the sensor module adequately. The sensor module buffer capacitor C4 at the output of the current limiter circuit 90' is charged.

When the voltage VOS at the output of the current limiter circuit 90' exceeds the first threshold e.g. 10V, the capacitor C4 is charged enough and the bypass switch is closed for optimal power transfer and minimal circuitry losses. It is allowed to close the bypass switch because the voltage on C4 is higher than the minimal DALI voltage.

Also when the bypass switch is closed, the voltage at e.g. VOS continues to be monitored.

The voltage of VOS may for example still increase to a nominal 12 V level or higher, maximally up to about 19V, depending on the DALI driver. The sensor module functionality is increased in a staggered manner to full functionality.

The normal operating condition for the sensor module is reached when full functionality is achieved.

If during the normal operating condition (and with the bypass switch closed) the voltage VOS drops below the first threshold voltage of e.g. 10V by lack of power delivered by the DALI driver, the sensor module functionality is decreased until the voltage VOS is again above a higher threshold voltage e.g. 11V. When the voltage VOS exceeds this higher threshold voltage (e.g. 11V), the sensor module functionality is increased again while still monitoring the voltage level VOS. This control loop and the voltage measurement is executed by a master control unit.

Thus, there is cyclic control of the sensor function while the bypass switch is closed to provide most efficient power transfer.

Lack of available DALI power can occur when there is (temporary) intense DALI communication or when other devices connected to the DALI temporarily overload the DALI bus.

In an unexpected condition, when a minimal sensor module functionality is already selected and still the voltage VOS drops below the second threshold as mentioned above e.g. 9.5V, the bypass switch is opened. Opening the bypass switch will ensure a DALI load current below a maximal DALI load current by the sensor module current limiter. In this way, the minimal DALI driver voltage is respected and DALI operates within the DALI specification.

Opening the bypass switch in this scenario will probably result in sensor module power down. The sensor module will start up, when sufficient DALI power is available again.

The bypass function allows additional power to be available for the sensor module 140. For example for operation at the minimal 12V and 52 mA operation, the conventional circuit allows around 230 mW of power reception, whereas the bypass function enables an increase to around 300 mW.

An additional option shown in FIG. 16 is to detect a dynamic current sense (CS) voltage using a current sense resistor 152. This can provide additional information about the current delivered from the driver. This enables the by-pass function to be switched off in the event of a too high current in a fault condition.

The examples above relate to the use of a power supply system for lighting. The same approach may however be used in non-lighting applications.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. If a computer program is discussed above, it may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted the term "adapted to" is intended to be equivalent to the term "configured to". Any reference signs in the claims should not be construed as limiting the scope.

The invention claimed is:

1. A device for transmitting power to a remote device over first and second communication lines and for communication with the remote device over the first and second communication lines, comprising:

a power source for providing power to the first and/or second communication lines;

a first driver for implementing a first communications protocol which comprises coupling the first and second communication lines together to encode a first signal level and isolating the first and second communication lines from each other to encode a second signal level;

a second driver for implementing a second communications protocol which is configured for modulating the first communication line with a signal having a modulation depth below 100%, such that a voltage difference between the first communication line and the second communication line is never zero during the modulating of the first communication line;

wherein the second driver comprises a current limiter circuit between a power terminal and the first communication line and a shorting circuit for bypassing the current limiter circuit to thereby enable modulating voltage on the first communication line to occur while permitting continuous current supply to the remote device.

2. A device for receiving power from a remote device over first and second communication lines and for communication with the remote device over the first and second communication lines, comprising:

a power harvesting circuit for harvesting power from the first and/or second communication lines;

a first driver for implementing a first communications protocol which comprises coupling the first and second communication lines together to encode a first signal level and isolating the first and second communication lines from each other to encode a second signal level;

a second driver for implementing a second communications protocol which comprises modulating the first communication line with a signal having a modulation depth below 100%, such that a voltage difference between the first communication line and the second communication line is never zero;

wherein the second driver comprises a current limiter circuit between power supplied over the first communication line and a shorting circuit for bypassing the current limiter circuit to thereby enable modulating voltage on the first communication line to occur while permitting continuous current supply to the remote device.

3. A device as claimed in claim 1, comprising a controller, wherein the controller is adapted to:

send a request to the remote device using the first communications protocol to determine if the remote device has the capability to use the second communications protocol; and request a switch of the remote device to the second communications protocol, if it is determined that the remote device has the capability.

4. A device as claimed in claim 1, comprising a controller, wherein the controller is adapted to:

indicate using the first communications protocol, in response to a request from the remote device using the first communications protocol, that the device has the capability to use the second communications protocol; and switch to the second communications protocol, in response to an activation request from the remote device.

5. A device as claimed in claim 1, comprising:

a first receiver for receiving data encoded by the first communications protocol; and a second receiver for receiving data encoded by the second communications protocol.

6. A device as claimed in claim 5, wherein:

the first receiver comprises a voltage supply and a pull down circuit for selectively coupling the voltage supply to the output or pulling the output to ground, in dependence on the voltage on the first communication line; and the second receiver comprises a high-pass filter for receiving the voltage on the first communication line, a voltage clamp, and a comparator with hysteresis which receives the clamped filtered voltage, and generates the output of the second receiver.

7. A device as claimed in claim 1, wherein the first communications protocol is the DALI protocol.

8. A lighting system comprising a device as claimed in claim 1 comprising a lighting controller, and a device comprising a luminaire.

9. A method of transmitting power to a remote device over first and second communication lines and for communication with the remote device over the first and second communication lines, comprising:

providing power to the first and/or second communication lines; and selecting between:

a first communications protocol which comprises coupling the first and second communication lines together to encode a first signal level and isolating the first and second communication lines from each other to encode a second signal level; and a second communications protocol which comprises modulating the first communication line with a signal having a modulation depth below 100%, such that a voltage difference between the first communication line and the second communication line is never zero; thereby enable modulating voltage on the first communication line to occur while permitting continuous current supply to the remote device.

10. A method for receiving power from a remote device over first and second communication lines and for communication with the remote device over the first and second communication lines, comprising:

harvesting power from the first and/or second communication lines; and selecting between:

a first communications protocol which comprises coupling the first and second communication lines together to encode a first signal level and isolating the first and second communication lines from each other to encode a second signal level; and a second communications protocol which comprises modulating the first communication line with a signal having a modulation depth below 100%, such that a voltage difference between the first communication line and the second communication line is never zero; thereby enable modulating voltage on the first communication line to occur while permitting continuous current supply to the remote device.

* * * * *